United States Patent [19]
Meier-Westhues et al.

[11] Patent Number: 5,786,419
[45] Date of Patent: Jul. 28, 1998

[54] POWDER COATING COMPOSITION AND ITS USE FOR THE PREPARATION OF MATTE COATINGS

[75] Inventors: Hans-Ulrich Meier-Westhues, Leverkusen; Wolfgang Schultz, Krefeld; Hans Josef Laas, Köln; Walter Schäfer, Leichlingen; Hans-Peter Klee, Burscheid, all of Germany

[73] Assignee: Bayer Aktiengesellschaft, Leverkusen, Germany

[21] Appl. No.: 649,044

[22] Filed: May 16, 1996

[30] Foreign Application Priority Data

May 24, 1995 [DE] Germany .................. 195 19 006.8

[51] Int. Cl.$^6$ .................. C08J 3/00; C08K 3/20; C08L 75/00
[52] U.S. Cl. .................. 524/590; 428/423.1; 524/589; 524/539; 525/440; 525/454; 528/44; 528/59; 528/65; 528/66; 528/85
[58] Field of Search .................. 524/589, 590, 524/539; 428/423.1; 525/440, 454; 528/44, 59, 65, 66, 85

[56] References Cited

U.S. PATENT DOCUMENTS

| | | | |
|---|---|---|---|
| 3,842,035 | 10/1974 | Klaren et al. | 260/47 EN |
| 4,413,079 | 11/1983 | Disteldorf et al. | 524/169 |
| 4,463,154 | 7/1984 | Disteldorf et al. | 528/45 |
| 4,782,128 | 11/1988 | Gras et al. | 528/45 |
| 4,788,255 | 11/1988 | Pettit, Jr. et al. | 525/131 |
| 4,900,800 | 2/1990 | Halpaap et al. | 528/66 |
| 4,920,173 | 4/1990 | Gras | 524/590 |
| 5,055,524 | 10/1991 | Pettit, Jr. et al. | 525/172 |
| 5,310,848 | 5/1994 | Nozaki et al. | 528/45 |
| 5,492,955 | 2/1996 | Wamprecht et al. | 525/375 |

FOREIGN PATENT DOCUMENTS

| | | |
|---|---|---|
| 2130075 | 2/1995 | Canada . |
| 2147653 | 4/1973 | Germany . |
| 3232463 | 3/1984 | Germany . |
| 3328129 | 2/1985 | Germany . |
| 3328133 | 2/1985 | Germany . |
| 4427225 | 2/1996 | Germany . |

*Primary Examiner*—Patrick D. Niland
*Attorney, Agent, or Firm*—Joseph C. Gil; Thomas W. Roy

[57] ABSTRACT

The present invention relates to a powder coating composition for the production of matte coatings, containing A) a hydroxyl group-containing component, B) an addition polymerization compound which is based on aliphatic and/or cycloaliphatic diisocyanates and contains uretdione groups, C) a component which contains carboxyl and/or carboxylic acid anhydride groups and is selected from C1) aliphatic and/or cycloaliphatic dicarboxylic acids containing 4 to 20 carbon atoms, C2) monomeric and/or polymeric anhydrides of the acids C1) which may optionally be modified and C3) aliphatic hydroxycarboxylic acids containing 4 to 18 carbon atoms, and D) a component which contains groups which are reactive with carboxyl and/or carboxylic acid anhydride groups, provided that components A), B), C) and D) are present in amounts such that 0.6 to 1.4 isocyanate groups of component B) are present for each hydroxyl group of component A), 0.3 to 1.5 groups of component D) which are reactive with carboxyl and/or carboxylic acid anhydride groups are present for each carboxyl equivalent of component C) and the amount of components C) and D) is 10 to 40% by weight of the total amount of components A), B), C) and D). The present invention also relates to the use of this powder coating composition for coating heat-resistant substrates.

20 Claims, No Drawings

POWDER COATING COMPOSITION AND ITS USE FOR THE PREPARATION OF MATTE COATINGS

BACKGROUND OF THE INVENTION

1. Field of the Invention

The present invention relates to coating powder compositions for the production of matte coatings.

2. Description of the Prior Art

In addition to high solids coating compositions and aqueous coating compositions, the development of powder coating compositions is becoming increasingly important because they do not release solvents during their application and can be processed with a very high utilization of material.

High quality coatings which are resistant to light and weathering can be produced from thermally hardenable polyurethane powder coating compositions. The majority of known polyurethane (PUR) powder coating compositions are based on solid polyester polyols and solid aliphatic or cycloaliphatic blocked polyisocyanates.

For various applications, for example for coating office furniture and electrical and electronic appliances, or for purely decorative coatings, there is a considerable interest in powder coating compositions which produce matte surfaces on hardening. Glossy, strongly reflecting lacquer systems are also frequently undesirable for the coating of parts of facades. Therefore, there has been no lack of attempts aimed at developing matte PUR powder coating compositions.

The addition of finely divided mineral or polymeric matting agents, which is a commonly used method of obtaining a reduced degree of gloss in coatings, generally does not result in the desired result in powder coating compositions because the resulting coatings increasingly lose their mechanical properties with increasing content of matting agents. The "dry" mixing of two separately produced powder coating compositions based on different binder vehicles but which are formulated to give the same color, as described in DE-A- 2,147,653 and 2,247,779, also gives results which are only slightly satisfactory. The matte effects obtained in this manner are only poorly reproducible, particularly when the lacquer overspray has to be recycled.

DE-A 3,238,129 discloses polyurethane powder coatings which harden to give matte coatings and are based on polyester polyols in combination with pyromellitic anhydride and, as crosslinking agents, polyisocyanates blocked with ε-caprolactam and prepared from isophorone diisocyanate (IPDI).

Matte powder coatings are also obtained when hydroxyl polyesters are crosslinked with special derivatives of trans-1,4-diisocyanatocyclohexane, which are blocked with ε-caprolactam and have a melting point above 140° C. as described in DE-A 3,711,374 or with polyisocyanates which are blocked with ε-caprolactam and which contain urea groups, which can be obtained by the reaction of partially blocked isocyanates with di- or polyamines, as described in DE-A 3,739,479.

The use of blocked polyisocyanates containing special carboxyl groups in combination with polyepoxide crosslinking agents, e.g. triglycidyl isocyanurate (TGIC), as hardener components for pulverulent, hydroxy-functional binders is known from DE-A 3,232,463. After stoving, these "3-component" powder coating compositions produce highly weather-resistant coatings having matte effects which can be reproducibly adjusted.

These PUR powder coating compositions do harden to form matte surfaces, but suffer from the disadvantage that they contain blocked polyisocyanates as crosslinking components, which release the blocking agent as a so-called cleavage product during the stoving operation and discharge it to the environment. Handling these materials is therefore costly (e.g., air purification, recovery).

One attempt to eliminate these disadvantages of blocked polyisocyanate crosslinking agents is the use of IPDI coating powder hardeners which contain linear uretdione groups and which are free from blocking agents (e.g. EP-A 639,598, which corresponds to copending application, U.S. Serial No. 08/286,088, herein incorporated by reference). Crosslinking of these hardeners occurs by thermal cleavage of the uretdione groups. It is also known to use these uretdione powder coating hardeners, which are free from cleavage products, for the production of matte coatings.

DE-A 3,328,133 describes addition polymerization compounds based on an IPDI uretdione and having melting points above 130° C., which in combination with polyester polyols harden to form matte films. However, uretdione powder coating crosslinking agents of this type with high melting points can only be obtained with difficulty. Since significant cleavage of the uretdione ring occurs even at temperatures above about 110° C., products such as these can only be produced by an expensive process, i.e., in solution with a subsequent evaporation step. In addition, in order to prevent premature crosslinking a temperature of 80° to 110° C. must not be exceeded during the formulation of the final powder coating composition, in which the two reactants, polyol and hardener, are generally mixed by melt extrusion. Under mild extrusion conditions such as these, it is not possible to completely homogeneously incorporate the particularly high melting crosslinking agent in the binder vehicle component. The matte effect which can be obtained here is due to insufficient mixing of the two reactants. Due to the inhomogeneities present in the powder coating composition, the resulting coatings exhibit unsatisfactory surface properties.

Powder coating compositions for the production of matte coatings are known from EP-A 553,750, in which the compositions are based on a mixture of two hydroxyl polyesters having different OH numbers and reactivities and uretdione powder coating crosslinking agents which are based on IPDI and are free from cleavage products. However, this process is limited to the production of very special polyester polyols.

An object of the present invention is to provide new PUR coating compositions, which are free from cleavage products and harden to form coatings that are resistant to solvents and chemicals and have reproducibly adjustable low degrees of gloss.

This object may be achieved with the powder coating compositions according to the invention. The powder coating compositions according to the invention are based on the surprising observation that polyurethane powder coating compositions containing a polyester polyol and a crosslinking agent containing uretdione groups, which can generally be stoved to form high gloss coatings, produce coatings which are completely matte when a combination of a crosslinking component containing carboxyl and/or carboxylic acid anhydride groups and a further crosslinking component containing groups which are reactive towards carboxyl and/or carboxylic acid anhydride groups is additionally introduced into the formulation and all the components are homogenized by melt extrusion.

This was surprising because powder coating compositions which contain a polyester polyol, a uretdione hardener and only one further crosslinking component, for example, either the crosslinking component containing carboxyl and/or carboxylic acid anhydride groups or the crosslinking component which is reactive with carboxyl and/or carboxylic acid anhydride groups, produce high gloss coatings. In addition, a composition containing carboxyl and/or carboxylic acid anhydride groups and a crosslinking component containing groups which are reactive with carboxyl and/or carboxylic acid anhydride groups also results in a high gloss coating.

Therefore, it could not be predicted that the powder coating compositions according to the invention would harden to form matte surfaces, especially since it is known that the addition of a combination of a high molecular weight powder coating binder vehicle containing carboxyl groups and a component which reacts with this binder vehicle, for example a polyexpoxide crosslinking agent, results in a polyurethane powder coating composition which likewise hardens to form a glossy coating. Despite the disadvantages described above, it is in fact customary in the industry to produce matte powder coating compositions by the process described in DE-A 2,147,653 and 2,247,779, by "dry" mixing and subsequent grinding together two separately formulated powder coating compositions of different chemical structures and reactivities, for example a polyurethane powder coating composition and a second powder coating composition, e.g., a carboxyl polyester and a polyepoxide crosslinking agent. The homogenization of these two reactive systems by melt extrusion always results in high gloss powder coatings.

SUMMARY OF THE INVENTION

The present invention relates to a powder coating composition for the production of matte coatings containing A) a hydroxyl group-containing component which is solid below 40° C. and liquid above 130° C., and has an OH number of 25 to 200 and a number average molecular weight of 400 to 10,000, B) an addition polymerization compound which is based on aliphatic and/or cycloaliphatic diisocyanates, contains uretdione groups and optionally free isocyanate groups, and is solid below 40° C. and liquid above 125° C., C) a component which contains carboxyl and/or carboxylic acid anhydride groups, is solid below 40° C. and liquid above 160° C., and is selected from
   C1) aliphatic and/or cycloaliphatic dicarboxylic acids containing 4 to 20 carbon atoms,
   C2) monomeric and/or polymeric anhydrides of the acids C1) which may optionally be modified and
   C3) aliphatic hydroxycarboxylic acids containing 4 to 18 carbon atoms, and D) a component which contains groups which are reactive with carboxyl and/or carboxylic acid anhydride groups and which has an weight average molecular weight of 200 to 5000, provided that components A), B), C) and D) are present in amounts such that i) 0.6 to 1.4 isocyanate groups of component B) are present for each hydroxyl group of component A), ii) 0.3 to 1.5 groups of component D) which are reactive with carboxyl and/or carboxylic acid anhydride groups are present for each carboxyl equivalent of component C) and iii) the amount of components C) and D) is 10 to 40% by weight of the total amount of components A), B), C) and D).

The present invention also relates to the use of this powder coating composition for coating heat-resistant substrates.

DETAILED DESCRIPTION OF THE INVENTION

Component A) is selected from the hydroxyl group-containing compounds which are known from powder coating technology, which have a hydroxyl number of 25 to 200, preferably 30 to 150,and a number average molecular weight, which may be calculated from the functionality and hydroxyl content, of 400 to 10,000, preferably 1000 to 5000, and which are solid below 40° C. and liquid above 130° C.

Examples of these compounds include polyesters, polyacrylates and polyurethanes which contain hydroxyl groups, such as those described in EP-A 45,998 and 254,152 (which correspond to U.S. Pat. Nos. 4,463,154 and 4,900,800, the disclosures of which are herein incorporated by reference), and mixtures of these resins.

Preferred compounds for use as component A) are polyesters which contain hydroxyl groups and have a softening temperature (determined by differential thermal analysis, DTA) of 40° to 120° C., preferably 45° to 110° C.

Component B) is selected from addition polymerization compounds which contain uretdione groups and optionally free isocyanate groups and which are based on aliphatic and/or cycloaliphatic diisocyanates, preferably 1,6-hexamethylene diisocyanate (HDI), 1-isocyanato-3,3,5-trimethlyl-5-isocyanotomethyl cyclohexane (isophorone diisocyanate, IPDI), 4,4'-diisocyanatodicyclohexyl methane and mixtures thereof.

These addition polymerization compounds generally have a uretdione group content (calculated as $C_2N_2O_2$, molecular weight 84) of 3 to 17% by weight and a melting point or melting range of 40° to 125° C.

The preparation of addition polymerization compounds such as these by the reaction of polyisocyanates containing uretdione groups with difunctional and optionally monofunctional isocyanate-reactive compounds, preferably dihydric and optionally monohydric alcohols, is known and described, e.g., in DE-A 2,420,475, EP-A 45,996, 45,998.

Preferred addition polymerization compounds are those which have a free isocyanate group content (calculated as NCO, molecular weight 42) of 0 to 2% by weight, a uretdione group content (calculated as $C_2N_2O_2$, molecular weight 84) of 3 to 16% by weight, a urethane group content (calculated as $CHNO_2$, molecular weight 59) of 10 to 22% by weight, a carboxylic acid ester group content (calculated as $CO_2$, molecular weight 44) of 0 to 20% by weight and a carbonate group content (calculated as $CO_3$, molecular weight 60) of 0 to 25% by weight, provided that the total content of carboxylic acid ester and carbonate groups is at least 1% by weight.

Addition polymerization compounds such as these, which contain uretdione groups, may be prepared according to EP-A 639,598, by the reaction of I) polyisocyanates which contain uretdione groups and which have an average functionality of 2.0 and II) optionally up to 70% by weight, based on the total weight of components 1) and 11), of other diisocyanates with III) diols which contain ester groups and/or carbonate groups and have .an average molecular weight of 134 to 1200, IV) optionally up to 80% by weight, based on the total weight of components II) and IV), of diols which are free from ester groups and carbonate groups and have an average molecular weight of 62 to 300 and V) optionally up to 40% by weight, based on the total weight of components II), IV) and V), of other monofunctional isocyanate-reactive compounds, at an equivalent ratio of isocyanate groups to isocyanate-reactive groups of 1.2:1 to 0.6:1.

Component B) is used in the powder coating compositions according to the invention in amounts such that 0.6 to 1.4, preferably 0.8 to 1.2, isocyanate groups of component B) are present for each hydroxyl group present of component A). In accordance with the present invention the isocyanate groups of component B) are understood to constitute the sum of the free isocyanate groups and the isocyanate groups present in dimeric form as uretdione groups.

Component C) contains carboxyl and/or carboxylic acid anhydride groups and contains at least one compound selected from C1) aliphatic and/or cycloaliphatic dicarboxylic acids containing 4 to 20 carbon atoms, C2) monomeric and/or polymeric anhydrides of the acids C1) and C3) aliphatic hydroxycarboxylic acids containing 4 to 18 carbon atoms.

Examples of suitable dicarboxylic acids C1) include succinic acid, glutaric acid, adipic acid, pimelic acid, suberic acid, azelaic acid, sebacic acid, dodecane diacid (1,10-decane dicarboxylic acid) or hexahydrophthalic acid.

Examples of suitable components C2) include monomeric anhydrides of the preceding dicarboxylic acids, such as the anhydrides of succinic acid, glutaric acid and hexahydrophthalic acid, and the polymeric anhydrides of these dicarboxylic acids, such as those obtained by intermolecular condensation of the acids or mixtures thereof. Specific examples include adipic acid (poly)anhydride, azelaic acid (poly)anhydride, sebacic acid (poly)anhydride or dodecane diacid (poly)anhydride. The weight average molecular weight ($M_w$, determined by gel chromatography using polystyrene as a standard) of these polyanhydrides is generally 1000 to 5000. The polyanhydrides are prepared, for example, by the reaction of the dicarboxylic acids or mixtures of the dicarboxylic acids with acetic anhydride at temperatures of 120° to 200° C., preferably 120° to 170° C. The acetic acid which is split off during the reaction may be removed by distillation under vacuum.

Examples of suitable components C2) also include modified anhydrides of the dicarboxylic acids cited under C1), for example, the polyol-modified polyanhydrides obtained according to EP-A 299 420, (which corresponds to U.S. Pat. No. 5,055,524, herein incorporated by reference). The molar ratio of anhydride groups to carboxyl groups in these polyol-modified polyanhydrides is generally 0.04:1 to 5:1, preferably 1:1 to 3:1.

Suitable components C) also include polyisocyanate-modified polyanhydrides, such as those obtained according to DE-A 4 427 225 (which corresponds to copending application, U.S. Ser. No. 08/504,159, herein incorporated by reference), by the reaction of dicarboxylic acids and/or dicarboxylic acid (poly)anhydrides with organic polyisocyanates and optionally with other compounds which contain amino and/or hydroxyl groups and are reactive with anhydride groups. These polyisocyanate-modified dicarboxylic acid (poly)anhydrides preferably have a carboxyl group content (calculated as $CO_2H$, molecular weight 45) of 0.5 to 30% by weight, a carboxylic acid anhydride group content (calculated as $C_2O_3$, molecular weight 72) of 5 to 35% by weight, and a nitrogen content which is present in the form of amide and/or urea groups of 0.2 to 8% by weight.

Suitable hydroxycarboxylic acids C3) are those which have a melting point between 40° and 160° C., preferably 40° to 150° C. Examples include 2-hydroxyisobutyric acid (81° C.), 2-hydroxyhexanoic acid (61° C.), 10-hydroxydecanoic acid (76° C.), 12-hydroxydodecanoic acid (86° C.), 16-hydroxyhexadecanoic acid (98° C.) and 12-hydroxyoctadecanoic acid (80° C.).

These hydroxycarboxylic acids are generally only used in combination with polyanhydrides C2), which are preferably not modified, in amounts of up to 50% by weight, based on the weight of the polyanhydrides.

Component C) most preferably exclusively contains at least one saturated aliphatic dicarboxylic acid containing 4 to 12 carbon atoms, a monomeric or polymeric anhydride of these dicarboxylic acids, or a polyanhydride of these dicarboxylic acids which is modified with aliphatic and/or cycloaliphatic polyisocyanates.

Component D) is selected from compounds containing groups which are reactive with carboxyl and/or carboxylic acid anhydride groups and have an weight average molecular weight of 200 to 5000, preferably 200 to 2000, and more preferably 250 to 1000, such as those which are generally used in powder coating technology as crosslinking components for powder coating compounds containing carboxylic hydroxyl groups.

Examples of suitable components D) include the known polyepoxides, such as triglycidyl isocyanurate (TGIC), triglycidyl urazole or oligomers thereof; glycidyl ethers, such as those based on bisphenol A; and glycidyl esters, such as those based on phthalic acid or tetrahydro- and hexahydrophthalic acids; and mixtures of these polyepoxides.

Examples of suitable components D) also include compounds containing β-hydroxyalkylamide groups, such as those described in EP-A 322,834 as crosslinking components for polyesters containing carboxyl groups. These β-hydroxyalkylamides are generally prepared by the base-catalyzed reaction of organic polycarboxylic acid esters with β-hydroxyalkylamines at temperatures up to 200° C. with the simultaneous removal by distillation of the alcohol which is formed.

Substances which are preferably used as component D) in the powder coating compositions according to the invention are TGIC and/or oligomers thereof, and β-hydroxyalkylamides based on saturated dicarboxylic acid esters containing 4 to 12 carbon atoms in the dicarboxylic acid portion. Most preferably, component D) is a β-hydroxyalkylamide obtained by the reaction of diethanolamine with a mixture of 9 parts by weight of dimethyl adipate and 1 part by weight of dimethyl glutarate.

Component D) is used in the powder coating compositions according to the invention in amounts such that 0.3 to 1.5, preferably 0.4 to 1.2, groups of component D) which are reactive towards carboxyl and/or carboxylic acid anhydride groups are present for each carboxyl equivalent of component C). In accordance with the present invention one carboxyl group corresponds to one carboxyl equivalent and one carboxylic acid anhydride group corresponds to two carboxyl equivalents.

In the powder coating compositions according to the invention, components C) and D) are present in an amount of 10 to 40% by weight, preferably 15 to 35% by weight, based on the total weight of components A), B), C) and D).

The powder coating compositions according to the invention may optionally also contain the additives which are known from powder coating technology. Examples of these additives include catalysts, such as tin(II) hexanoate, tin(II) octanoate, tin(II) laurate, dibutyltin oxide, dibutyltin chloride, dibutyltin diacetate, dibutyltin dilaurate, dibutyltin maleate, dioctyltin diacetate, 1,4-diazabicyclo[2.2.2]octane, 1,5-diazabicyclo[4.3.0]non-5-ene, 1,8-diazabicyclo[5.4.0]-undec-7-ene and mixtures thereof. Other suitable catalysts, as well as details concerning their mode of action are described in the Kunststoffhandbuch [*Plastics Handbook*], Volume VIII, edited by Vieweg and Höchtlen, Carl-Hanser-Verlag, Munich 1966, pages 96 to 102. The catalysts are optionally used in amounts of 0.1 to 5% by weight, preferably 0.1 to 3% by weight, based on the total weight of components A), B), C) and D).

Examples of other additives E) also include spreading agents, such as polybutyl acrylate or polysilicones; light stabilizers, such as sterically hindered amines; UV absorbers, such as benzotriazoles or benzophenones; and pigments, such as titanium dioxide.

Other additives E) include color stabilizers which impart protection from the risk of yellowing due to over-firing. Examples include trialkyl and/or triaryl phosphites, such as triethyl phosphite, triphenyl phosphite and preferably tris-alkylphenyl phosphites in which the alkyl substituents contain 6 to 12 carbon atoms. Trisnonyl phenyl phosphite, which is commercially available, is especially preferred and is based on the reaction product of an ester of phosphoric acid with the addition product of tripropylene and phenol.

In order to produce the powder coating composition, components A), B), C), D) and optionally E) are intimately mixed and subsequently combined in the melt to form a homogeneous material. This may be carried out in suitable processing units, for example heated kneaders, but is preferably carried out by melt extrusion, wherein the extrusion temperature is generally selected so that the maximum shear forces act on the mixture. An upper temperature limit of 110° C. should not be exceeded during procedure, however, in order to prevent premature crosslinking of the powder coating composition.

In this process, the sequence of combining the individual components A) to E) may be carried out according to a number of different embodiments. In a preferred embodiment only two of the individual components, for example components B) and C), are mixed together in the melt in a first step, preferably directly after the preparation of one of components B) or C). The remaining components are not added to the resulting homogeneous material, which is storage stable, until a later point in time, in a second step. Thereafter the resulting mixture is extruded.

Regardless of the method selected, the amounts of the individual components A), B), C) and D) are selected so that 0.6 to 1.4, preferably 0.8 to 1.2, isocyanate groups of component B) are present for each hydroxyl group of component A), and 0.3 to 1.5, preferably 0.4 to 1.2, groups of component D) which are reactive towards carboxyl and/or carboxylic acid anhydride groups are present for each carboxyl equivalent of component C). Hydroxyl groups which may optionally be present in components C) and/or D) are not included in selecting the amounts of the individual components. Therefore, the NCO/OH equivalent ratio After cooling to room temperature, and after a suitable preliminary comminution stage, the extruded material is ground to form a powder coating composition and is freed by sieving from particle sizes larger than the desired particle size, for example larger than 0.1 mm.

The powder coating compositions which are produced in this manner may be applied to the substrate to be coated by customary powder application methods such as electrostatic powder spraying or whirl sintering. Hardening of the coatings is effected at temperatures of 110° to 220° C., preferably 130° to 200° C., over a period of about 10 to 30 minutes. Completely matt, hard elastic coatings are obtained which are characterized by their outstanding spreading behavior and by their good resistance to solvents and chemicals.

Any heat-resistant substrates (e.g. glass, metals and plastics) may be coated according to the invention.

In the following examples parts and percentages are by weight unless otherwise indicated.

EXAMPLES

Preparation of starting components

Addition polymerization compound B-a) containing uretdione groups a) Preparation of a diol containing ester groups:

901 g of 1,4-butanediol and 1712 g of ε-caprolactone were mixed under a nitrogen atmosphere at room temperature. 0.3 g of tin(II) octanoate was then added and the mixture was subsequently heated for 5 hours at 160° C. After cooling to room temperature, a colorless liquid product was obtained which had the following characteristic properties:

| | |
|---|---|
| η (23° C.): | 180 mPas |
| OH number: | 416 mg KOH/g |
| free caprolactone: | 0.2% |
| number average molecular weight (calculated from OH number): | 269 |
| ester group content (calculated): | 25.3% | b) Preparation of component B-a) containing ester groups and uretdione groups:

1000 g (4.3 equivalents) of a polyisocyanate which contained uretdione groups, was based on 1-isocyanato-3,3,5-trimethyl-5-isocyanatomethyl-cyclohexane (IPDI), and had a free isocyanate group content of 17.9% and a uretdione group content (determined by hot titration) of 19.1%, were heated to 80° C. under dry nitrogen. A mixture of 457 g (3.4 equivalents) of the diol containing ester groups described in part a) above and 117 g (0.9 equivalents) of 2-ethyl-1-hexanol was then added over 30 minutes and stirred at a maximum reaction temperature of 105° C., until the NCO content of the reaction mixture had decreased to a value of 0.7% after about 2 hours.

The melt was cooled by pouring it on to a metal plate, and a practically colorless solid resin was obtained which had the following characteristic properties:

| | |
|---|---|
| NCO content: | 0.7% |
| uretdione group content (calculated): | 12.1% |
| total NCO content (calculated): | 12.8% |
| melting point: | 82 to 83° C. |

Addition polymerization compound B-b) containing uretdione groups 1000 g (4.3 equivalents) of the polyisocyanate containing uretdione groups which was used for the preparation of component B-a) were mixed with 1270 g of anhydrous toluene at 80° C. under dry nitrogen. A mixture of 153 g (3.4 equivalents) of 1,4-butanediol and 117 g (0.9 equivalents) of 2-ethyl-1-hexanol was added over 30 minutes and was stirred at a reaction temperature of 100° C. until the NCO content had decreased to a value of 0.2%. The yellowish solution obtained was then completely freed from solvent by spray drying in a commercially available laboratory spray drier (Minispray Dryer 190, manufactured by Büchi). A pale yellow product was obtained, which had the following characteristic properties:

| | |
|---|---|
| NCO content: | 0.3% |
| uretdione group content (calculated): | 15.0% |
| total NCO content (calculated): | 15.3% |
| melting point: | 105 to 111° C. |

Polyisocyanate-modified polyanhydride C2-a) (analogous to DE-A 4,427,225 (which corresponds to copending application, U.S. Ser. No. 08/504,159)

1000 g (8.7 equivalents) of dodecanoic acid were mixed under nitrogen with 240 g (2.4 moles) of acetic anhydride and 200 g (1.0 equivalent) of a polyisocyanate which contained isocyanurate groups, was based on hexamethylene diisocyanate, and had an isocyanate content of 21.5% and a viscosity at 23° C. of 3000 mPas. The mixture was heated to 125° C. and subsequently stirred for 4 hours at this temperature. The acetic acid formed was then distilled off in a gentle stream of $N_2$. A colorless crystalline product was obtained which had a melting range (DTA) of 84° to 104° C., a carboxyl group content (calculated as $CO_2H$; molecular weight 45) of 11.8%, a carboxylic acid anhydride group content (calculated as $C_2O_3$, molecular weight 72) of 15.6%, and a nitrogen content present in the form of amide and urea groups of 1.3%. The carboxyl equivalent weight was calculated to be 144 g/equivalent.

Mixture of addition polymerization compound B-a), containing uretdione groups, and polyisocyanate-modified polyanhydride C2-a)

Following the preparation of addition polymerization compound B-a), containing uretdione groups and after reaching a free NCO content of 0.8%, solid polyisocyanate-modified polyanhydride C2-a) was added in portions to the reaction mixture at a temperature of 105° C., in an amount of 40%, based on the total weight of components B-a) and C2-a), and stirring was continued for about 10 to 15 minutes at this temperature after the polyanhydride had melted completely. The melt was cooled by pouring it on to a metal plate. An almost colorless solid resin was obtained, which was storage stable and had the following characteristic properties:

| | |
|---|---|
| NCO content: | 0.5% |
| uretdione group content (calculated): | 7.3% |
| total NCO content (calculated): | 7.8% |
| carboxyl equivalent weight: | 360 g/equivalent |
| melting point: | 69 to 72° C. |

β-hydroxyalkylamide D-a)

900 g (5.2 mole) of dimethyl adipate were mixed with 100 g (0.6 mole) of dimethyl glutarate, 1460 g (13.9 mole) of diethanolamine and 5 g of potassium hydroxide in a stirred vessel with a distillation attachment, and heated to a temperature of 100°–110° C. The methanol formed was distilled from the reaction mixture during this procedure. After about 200 g of methanol had been removed, a vacuum of about 150 mbar was applied to the reaction apparatus and an additional of about 100 g of methanol was distilled off.

The distillation attachment was then removed and the reaction mixture was mixed with 350 g of fresh methanol and 2 liters of acetone. The resulting precipitate was filtered off under suction, washed with acetone and dried. A pale yellow powder was obtained which had a melting point of 118° to 120° C. The equivalent weight was 80 g|equivalent of hydroxyethylamide groups.

Example 1

39.0 parts of a polyester which contained hydroxyl groups, was prepared from 66.6 parts of terephthalic acid, 38.2 parts of neopentyl glycol, 5.3 parts of 1,6-hexanediol and 4.5 parts of 1,1,1-trimethlolpropane, and had an OH number of 50 and a melting range (determined by differential thermal analysis) of 55° to 60° C., were thoroughly mixed with 11.4 parts of addition polymerization compound B-a) (which corresponded to an NCO:OH equivalent ratio 1:1), 8.1 parts of polyisocyanate-modified polyanhydride C2-a) and 4.5 parts of β-hydroxylamide D-a) (which corresponded to an equivalent ratio of carboxyl groups to groups reactive with carboxyl and/or carboxylic acid anhydride groups of 1:1), 1.0 part of a commercially available spreading agent based on polybutyl acrylate (Modaflow Plil, manufactured by Monsanto), 1.0 part of tin(ll) octanoate as a catalyst, and 35.0 parts of a commercially available white pigment (Bayertitan R-KB4, Bayer AG). The resulting mixture was subsequently homogenized with the aid of a Type PLK 46 Buss co-kneader at 150 rpm and at an enclosure temperature of 60° C. in the inlet portion and on the shaft and 100° C. in the processing portion, wherein the temperature of the material reached 95° to 105° C. The solidified melt was ground and screened by means of an ACM 2 separator mill with a 90 μm screen (manufactured by Hosokawa Mikropul). The powder obtained in this manner was sprayed onto separate degreased steel plates using an ESB cup gun at a high voltage of 70 kV, and was hardened for 30 minutes either at 170° or 185° C. to form smooth, matte white lacquers.

The following coating properties were found at coating thicknesses of about 60 μm:

| | | 170° C. | 185° C. |
|---|---|---|---|
| ET[a)] | | 9.0 | 9.0 |
| Gloss[b)] | 20° | 2 | 4 |
| | 60° | 19 | 23 |
| Ac[c)] | DR | 50 | 50 |
| | Assessment | 1 | 0–1 |

[a)] ET = Erichsen cupping index according to DIN 53 156
[b)] Gloss = Gardner gloss, 20° or 60° angle of reflection
[c)] Ac = acetone test:
DR = number of double rubs with a saturated swab
Assessment:
0 = film intact
1 = film surface softened
2 = film swollen as far as substrate Examples 2–6

Powder coating compositions having the following compositions (in parts) were produced by the process described in Example 1 using the polyester described therein.

| Example | 2 | 3 | 4 | 5 (comparison) | 6 (comparison) |
|---|---|---|---|---|---|
| Polyester from Example 1 | 38.6 | 33.3 | 41.7 | 44.3 | 46.2 |
| Addition polymerization compound | | | | | |
| B-a) | — | 9.7 | 12.2 | 13.0 | 13.5 |
| B-b) | 9.5 | — | — | — | — |
| Polyanhydride C2-a) | — | 12.9 | 5.4 | 5.7 | — |
| Dodecane diacid | 8.8 | — | — | — | — |
| β-hydroxy-alkylamide | 6.1 | 7.1 | — | — | 3.3 |

-continued

| Example | 2 | 3 | 4 | 5 (comparison) | 6 (comparison) |
|---|---|---|---|---|---|
| D-a) | | | | | |
| TGIC | — | — | 3.7 | — | — |
| spreading agent (Ex 1) | 1.0 | 1.0 | 1.0 | 1.0 | 1.0 |
| Tin(II) octanoate | 1.0 | 1.0 | 1.0 | 1.0 | 1.0 |
| Titanium dioxide | 35.0 | 35.0 | 35.0 | 35.0 | 35.0 |

The powders were sprayed onto degreased steel plates using an ESB cup gun at a high voltage of 70 kV and were hardened for 30 minutes at 185° C. in each case.

The following coating properties were found at coating thicknesses of 60±5 μm:

| | | 2 | 3 | 4 | 5 (comparison) | 6 (comparison) |
|---|---|---|---|---|---|---|
| ET$^a$ | | 9.0 | >9.0 | 9.0 | 0.5 | 0.5 |
| Gloss$^b$ | 20° | 3 | 3 | 11 | 35 | 21 |
| | 60° | 21 | 20 | 34 | 84 | 64 |
| Ac$^c$ | DR | 50 | 50 | 50 | 50 | 50 |
| | Assessment | 1 | 0–1 | 1 | 2 m | 2 m |

$^a$ET = Erichsen cupping index according to DIN 53 156
$^b$Gloss = Gardner gloss, 20° or 60° angle of reflection
$^c$Ac = acetone test:
DR = number of double rubs with a saturated swab
Assessment:
0 = film intact
1 = film surface softened
2 = film swollen as far as substrate
m = matte (loss of gloss)

The comparison examples show that the addition of only one of components C) and D), i.e., a component containing carboxyl groups and/or carboxylic acid anhydride groups (comparison example 5), or a component containing groups which are reactive towards carboxyl and/or carboxylic acid anhydride groups (comparison example 6), to a polyurethane system containing a polyester polyol and an addition polymerization compound containing uretdione groups, results in coatings which are not matte and which only exhibit moderate elasticities and durability properties.

Example 7 (comparison)

A white coating composition was produced by the method described in Example 1 from 37.1 parts of the polyester described therein and 10.9 parts of addition polymerization compound B-a) (which corresponded to an NCO:OH equivalent ratio of 1:1), 14.7 parts of a polyester containing carboxyl groups (which was prepared from 44.8 parts of terephthalic acid, 6.8 parts of isophthalic acid, 48.9 parts of neopentyl glycol and 0.5 parts of pentaerythritol, and had an acid number of 15.5 and a melting range, determined by differential thermal analysis, of 65° to 70° C.), 0.3 parts of β-hydroxyalkylamide D-a) (which corresponded to an equivalent ratio of carboxyl groups to groups which are reactive towards carboxyl groups of 1:1), 1.0 part of the spreading described in Example 1, 1.0 part of tin(II) octanoate as a catalyst and 35.0 parts of the pigment described in Example 1.

The powder was sprayed on to a degreased steel plate using an ESB cup gun at a high voltage of 70 kV and was hardened for 30 minutes at 185° C.

A glossy coating was obtained, which had the following properties at a coating thickness of about 65 μm:

| ET$^a$ | | 9.0 |
|---|---|---|
| Gloss$^b$ | 20° | 63 |
| | 60° | 89 |
| Ac$^c$ | DR | 50 |
| | Assessment | 2 |

$^a$ET = Erichsen cupping index according to DIN 53 156
$^b$Gloss = Gardner gloss, 20° or 60° angle of reflection
$^c$Ac = acetone test:
DS = number of double rubs with a saturated swab
Assessment:
0 = film intact
1 = film surface softened
2 = film swollen as far as substrate
m = matte (loss of gloss)

This comparison example shows that the addition of a combination of a high molecular weight carboxyl polyester and a crosslinking agent which is reactive towards carboxyl groups to a polyurethane system consisting of a polyester polyol and an addition polymerization compound which contains uretdione groups does not result in a matte coating, but rather in a glossy coating which also only exhibits a moderate resistance to solvents.

Example 8

A black pigmented powder coating composition was produced by the method described in Example 1 from 39.7 parts of the polyester described therein, 19.1 parts of the previously described mixture of addition polymerization compound B-a) with the polyisocyanate-modified polyanhydride C2-a), 4.2 parts of β-hydroxyalkylamide D-a) (which corresponded to an NCO:OH equivalent ratio of 1:1 and an equivalent ratio of carboxyl groups to groups which are reactive with carboxyl and/or carboxylic acid anhydride groups of 1:1), 1.0 part of the spreading agent described in Example 1, 1.0 part of tin(II) octanoate as a catalyst, 1.1 parts of carbon black (Flammruβ 101, manufactured by Degussa), and 33.9 parts of a commercially available extender (Blanc Fix M, manufactured by Sachtleben). The powder was subsequently sprayed onto a degreased steel plate using an ESB cup gun at a high voltage of 70 kV and was hardened for 30 minutes at 1 85° C. The matte black coating obtained exhibited the following coating properties at a coating thickness of about 70 μm:

| ET$^a$ | | >9.0 |
|---|---|---|
| Gloss$^b$ | 20° | 2 |
| | 0° | 21 |
| Ac$^c$ | DR | 50 |
| | Assessment | 0–1 |

$^a$ET = Erichsen cupping index according to DIN 53 156
$^b$Gloss = Gardner gloss, 20° or 60° angle of reflection
$^c$Ac = acetone test:
DR = number of double strokes with a saturated swab
Assessment:
0 = film intact
1 = film surface softened
2 = film swollen as far as substrate Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A powder coating composition for the production of matte coatings comprising
   A) a hydroxyl group-containing component which is solid below 40° C. and liquid above 130° C., and has an OH number of 25 to 200 and a number average molecular weight of 400 to 10,000,
   B) an addition polymerization compound which is based on aliphatic and/or cycloaliphatic diisocyanates, contains uretdione groups and optionally free isocyanate groups, and is solid below 40° C. and liquid above 125° C.,
   C) a component which contains carboxyl and/or carboxylic acid anhydride groups, is solid below 40° C and liquid above 160° C., and is selected from
      C1) aliphatic and/or cycloaliphatic dicarboxylic acids containing 4 to 20 carbon atoms,
      C2) monomeric and/or polymeric anhydrides of the acids C1) which may optionally be modified with polyols or polyisocyanates and
      C3) aliphatic hydroxycarboxylic acids containing 4 to 18 carbon atoms, and
   D) a component which contains groups which are reactive with carboxyl and/or carboxylic acid anhydride groups and which has a weight average molecular weight of 250 to 1000,
   provided that components A), B), C) and D) are present in amounts such that
      i) 0.6 to 1.4 isocyanate groups of component B) are present for each hydroxyl group of component A),
      ii) 0.3 to 1.5 groups of component D) which are reactive with carboxyl and/or carboxylic acid anhydride groups are present for each carboxyl equivalent of component C) and
      iii) the amount of components C) and D) is 10 to 40% by weight, based on the total weight of components A), B), C) and D).

2. The powder coating composition of claim 1 wherein component A) comprises a polyester which contains hydroxyl groups and has a softening temperature determined by differential thermal analysis (DTA) of 40° to 120° C., an OH number of 25 to 200 and a number average molecular weight of 1000 to 5000.

3. The powder coating composition of claim 1 wherein said addition polymerization compound is based on isophorone diisocyanate.

4. The powder coating composition of claim 1 wherein component B) comprises an addition polymerization compound having
   a) a free isocyanate group content (calculated as NCO, molecular weight 42) of 0 to 2% by weight,
   b) a uretdione group content (calculated as $C_2N_2O_2$, molecular weight 84) of 3 to 16% by weight,
   c) a urethane group content (calculated as $CHNO_2$, molecular weight 59) of 10 to 22% by weight,
   d) a carboxylic acid ester group content (calculated as $CO_2$, molecular weight 44) of 0 to 20% by weight, and
   e) a carbonate group content (calculated as $CO_3$, molecular weight 60) of 0 to 25% by weight,
   provided that the total carboxylic acid ester and carbonate group content of the addition polymerization compound is at least 1% by weight.

5. The powder coating composition of claim 1 wherein component C) comprises at least one polyisocyanate-modified dicarboxylic acid (poly)anhydride based on a saturated aliphatic dicarboxylic acid containing 4 to 12 carbon atoms and having a carboxyl group content (calculated as $CO_2H$: molecular weight 45) of 0.5 to 30% by weight, a carboxylic acid anhydride group content (calculated as $C_2O_3$, molecular weight 72) of 5 to 35% by weight, and a nitrogen content which is present in the form of amide and/or urea groups of 0.2 to 8% by weight.

6. The powder coating composition of claim 1 wherein component D) comprises triglycidyl isocyanurate and/or oligomers thereof or a β-hydroxyalkylamide based on saturated dicarboxylic acids containing 4 to 12 carbon atoms.

7. The powder coating composition of claim 1 wherein component D) comprises a β-hydroxyalkylamide which is prepared by the reaction of diethanolamine with a mixture of 9 parts by weight of dimethyl adipate and 1 part by weight of dimethyl glutarate.

8. The powder coating composition of claim 1 wherein components A), B), C) and D) are present in amounts such that
   i) 0.8 to 1.2 isocyanate groups of component B) are present for each hydroxyl group of component A),
   ii) 0.4 to 1.2 groups of component D) which are reactive with carboxyl and/or carboxylic acid anhydride groups are present for each carboxyl equivalent of component C) and
   iii) the amount of components C) and D) is 15 to 35% by weight, based on the total weight of components A), B), C) and D).

9. A powder coating composition for the production of matte coating comprising
   A) a polyester which contains hydroxyl groups and has a softening temperature determined by differential thermal analysis (DTA) of 40° to 120° C., an OH number of 25 to 200 and a number average molecular weight of 1000 to 5000
   B) an addition polymerization compound which is based on aliphatic and/or cycloaliphatic diisocyanates, is solid below 40° C. and liquid above 125° C., and has
      a) a free isocyanate group content (calculated as NCO, molecular weight 42) of 0 to 2% by weight,
      b) a uretdione group content (calculated as $C_2N_2O_2$, molecular weight 84) of 3 to 16% by weight,
      c) a urethane group content (calculated as $CHNO_2$, molecular weight 59) of 10 to 22% by weight,
      d) a carboxylic acid ester group content (calculated as $CO_2$, molecular weight 44) of 0 to 20% by weight, and
      e) a carbonate group content (calculated as $CO_3$, molecular weight 60) of 0 to 25% by weight,
   provided that the total carboxylic acid ester and carbonate group content of the addition polymerization compound is at least 1% by weight,
   C) a component which contains carboxyl and/or carboxylic acid anhydride groups, is solid below 40° C. and liquid above 160° C., and which is selected from
      C1) aliphatic and/or cycloaliphatic dicarboxylic acids containing 4 to 20 carbon atoms,
      C2) monomeric and/or polymeric anhydrides of the acids C1) which may optionally be modified with polyols or polyisocyanates and
      C3) aliphatic hydroxycarboxylic acids containing 4 to 18 carbon atoms, and
   D) a component which has an average molecular weight of 200 to 5000 and comprises triglycidyl isocyanurate and/or oligomers thereof or a β-hydroxyalkylamide based on saturated dicarboxylic acids containing 4 to 12 carbon atoms, provided that components A), B), C) and D) are present in amounts such that i) 0.6 to 1.4 isocyanate groups of component B) are present for each hydroxyl group of component A), ii) 0.3 to 1.5 groups of component D) which are reactive with carboxyl and/or carboxylic acid anhydride groups are present for each carboxyl equivalent of component C) and iii) the amount of components C) and D) is 10 to 40% by weight, based on the total weight of components A), B), C) and D).

10. The powder coating composition of claim 9 wherein component C) comprises at least one polyisocyanate-modified dicarboxylic acid (poly)anhydride based on a saturated aliphatic dicarboxylic acid containing 4 to 12 carbon atoms and having a carboxyl group content (calculated as $CO_2H$: molecular weight 45) of 0.5 to 30% by weight, a carboxylic acid anhydride group content (calculated as $C_2O_3$, molecular weight 72) of 5 to 35% by weight, and a nitrogen content which is present in the form of amide and/or urea groups of 0.2 to 8% by weight.

11. The powder coating composition of claim 9 wherein component D) comprises a β-hydroxyalkylamide which is prepared by the reaction of diethanolamine with a mixture of 9 parts by weight of dimethyl adipate and 1 part by weight of dimethyl glutarate.

12. The powder coating composition of claim 10 wherein component D) comprises a β-hydroxyalkylamide which is prepared by the reaction of diethanolamine with a mixture of 9 parts by weight of dimethyl adipate and 1 part by weight of dimethyl glutarate.

13. The powder coating composition of claim 9 wherein said addition polymerization compound is based on isophorone diisocyanate.

14. The powder coating composition of claim 10 wherein said addition polymerization compound is based on isophorone diisocyanate.

15. The powder coating composition of claim 11 wherein said addition polymerization compound is based on isophorone diisocyanate.

16. The powder coating composition of claim 12 wherein said addition polymerization compound is based on isophorone diisocyanate.

17. A matte coating prepared from the powder coating composition of claim 1 for the production of matte coatings.

18. A powder coating composition for the production of matte coatings comprising A) a hydroxyl group-containing component which is solid below 40° C. and liquid above 130° C., and has an OH number of 25 to 200 and a number average molecular weight of 400 to 10,000, B) an addition polymerization compound which is based on aliphatic and/or cycloaliphatic diisocyanates, contains uretdione groups and optionally free isocyanate groups, and is solid below 40° C. and liquid above 125° C., C) a component which contains carboxyl and/or carboxylic acid anhydride groups, is solid below 40° C and liquid above 160° C., and is selected from C1) aliphatic and/or cycloaliphatic dicarboxylic acids containing 4 to 20 carbon atoms, C2) monomeric and/or polymeric anhydrides of the acids C1) which may optionally be modified with polyols or polyisocyanates and C3) aliphatic hydroxycarboxylic acids containing 4 to 18 carbon atoms, and D) a component which contains groups which are reactive with carboxyl and/or carboxylic acid anhydride groups, has an average molecular weight of 200 to 5000 and comprises a member selected from the group consisting of glycidyl ethers and glycidyl esters, provided that components A), B), C) and D) are present in amounts such that i) 0.6 to 1.4 isocyanate groups of component B) are present for each hydroxyl group of component A), ii) 0.3 to 1.5 groups of component D) which are reactive with carboxyl and/or carboxylic acid anhydride groups are present for each carboxyl equivalent of component C) and iii) the amount of components C) and D) is 10 to 40% by weight, based on the total weight of components A), B), C) and D).

19. The powder coating composition of claim 18 wherein component A) comprises a polyester which contains hydroxyl groups and has a softening temperature determined by differential thermal analysis (DTA) of 40° to 120° C., an OH number of 25 to 200 and a number average molecular weight of 1000 to 5000.

20. The powder coating composition of claim 18 wherein component B) comprises an addition polymerization compound having a) a free isocyanate group content (calculated as NCO, molecular weight 42) of 0 to 2% by weight, b) a uretdione group content (calculated as $C_2N_2O_2$, molecular weight 84) of 3 to 16% by weight, c) a urethane group content (calculated as $CHNO_2$, molecular weight 59) of 10 to 22% by weight, d) a carboxylic acid ester group content (calculated as $CO_2$, molecular weight 44) of 0 to 20% by weight, and e) a carbonate group content (calculated as $CO_3$, molecular weight 60) of 0 to 25% by weight, provided that the total carboxylic acid ester and carbonate group content of the addition polymerization compound is at least 1% by weight.

\* \* \* \* \*